(12) United States Patent
Itoh et al.

(10) Patent No.: US 9,805,265 B2
(45) Date of Patent: Oct. 31, 2017

(54) SURVEILLANCE CAMERA CONTROL DEVICE AND VIDEO SURVEILLANCE SYSTEM

(75) Inventors: Masaya Itoh, Tokyo (JP); Ryo Yumiba, Tokyo (JP); Yuan Li, Tokyo (JP)

(73) Assignee: HITACHI, LTD., Tokyo (JP)

( * ) Notice: Subject to any disclaimer, the term of this patent is extended or adjusted under 35 U.S.C. 154(b) by 310 days.

(21) Appl. No.: 14/403,771

(22) PCT Filed: May 30, 2012

(86) PCT No.: PCT/JP2012/003516
§ 371 (c)(1),
(2), (4) Date: Nov. 25, 2014

(87) PCT Pub. No.: WO2013/179335
PCT Pub. Date: Dec. 5, 2013

(65) Prior Publication Data
US 2015/0103178 A1   Apr. 16, 2015

(51) Int. Cl.
*G06K 9/00* (2006.01)
*H04N 7/18* (2006.01)
*G08B 13/196* (2006.01)

(52) U.S. Cl.
CPC ..... *G06K 9/00718* (2013.01); *G06K 9/00771* (2013.01); *G08B 13/19641* (2013.01); *G08B 13/19693* (2013.01); *H04N 7/181* (2013.01); *G06K 2009/00738* (2013.01)

(58) Field of Classification Search
CPC ........ G08B 13/19641; G08B 13/19608; G08B 13/19645; G08B 13/19693; G06K 9/00771
See application file for complete search history.

(56) References Cited

U.S. PATENT DOCUMENTS 6,359,647 B1 *  3/2002  Sengupta ......... G08B 13/19608
                                                  348/143
2004/0263625 A1 * 12/2004  Ishigami .......... G08B 13/19608
                                                  348/152
(Continued)

FOREIGN PATENT DOCUMENTS

JP    2001-275104 A    10/2001
JP    2002-522980 A     7/2002
(Continued)

*Primary Examiner* — Neil Mikeska
(74) *Attorney, Agent, or Firm* — Baker Botts L.L.P.

(57) ABSTRACT

In a video surveillance system, confirming videos from plurality of cameras causes a heavy burden on surveillance officers, and it is difficult to select a suitable video for observation.
A video surveillance system includes a plurality of cameras which pick up images in a surveillance area, and a recognition unit which detects an object from videos acquired by the plurality of cameras. In the case where an object is detected in a surveillance area where images are picked up duplicately by the plurality of cameras, the recognition unit acquires a recognition result that is a feature quantity of the object for each camera. A display selection unit is, provided which, on the basis of the recognition result and a degree of priority of the recognition result, prioritizes the video from each of the cameras according to the degree of priority.

17 Claims, 8 Drawing Sheets

(56) References Cited

U.S. PATENT DOCUMENTS

| | | | | |
|---|---|---|---|---|
| 2007/0217765 A1* | 9/2007 | Itoh | ............ | H04N 5/76 386/202 |
| 2008/0166017 A1* | 7/2008 | Ito | ............ | G06K 9/00369 382/103 |
| 2010/0097470 A1* | 4/2010 | Yoshida | ............ | G08B 13/19641 348/159 |
| 2010/0201821 A1* | 8/2010 | Niem | ............ | G06K 9/00268 348/159 |
| 2010/0303296 A1* | 12/2010 | Hattori | ............ | H04N 19/15 382/103 |
| 2011/0157368 A1* | 6/2011 | Jo | ............ | H04N 7/181 348/159 |
| 2012/0033083 A1* | 2/2012 | Horbinger | ............ | G06T 7/2053 348/159 |

FOREIGN PATENT DOCUMENTS

| | | |
|---|---|---|
| JP | 2005-142683 A | 6/2005 |
| JP | 2010-103782 A | 5/2010 |
| JP | 2011-217320 A | 10/2011 |
| WO | 2012/096166 A1 | 7/2012 |

\* cited by examiner

[FIG. 1]
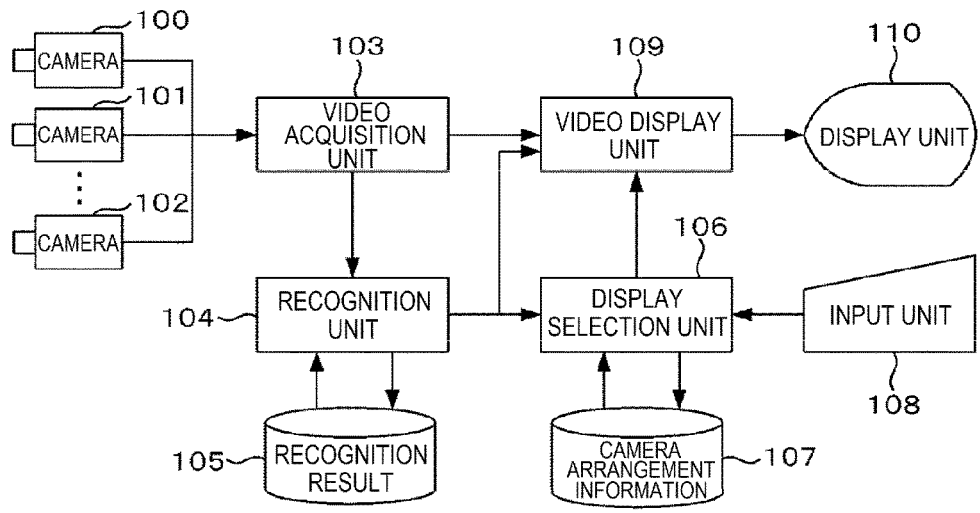
[FIG. 2]
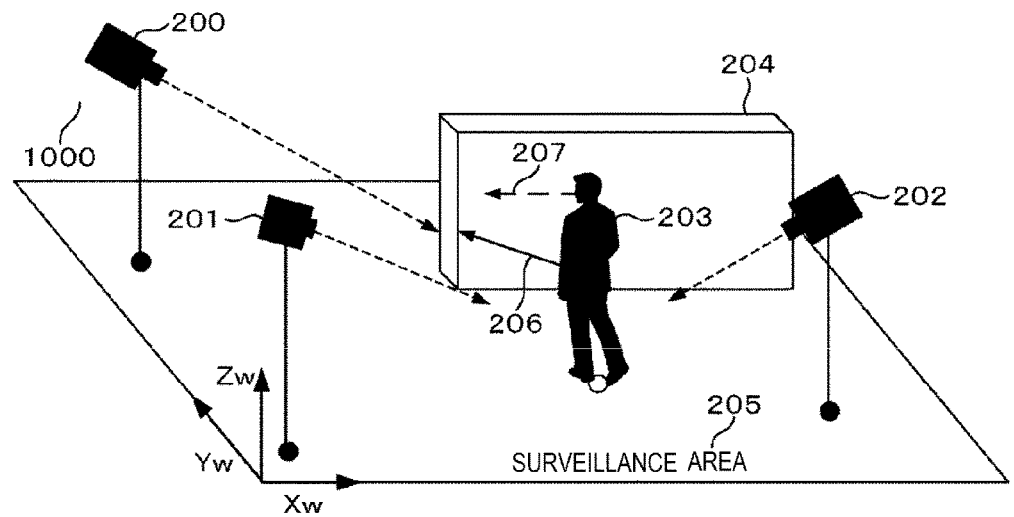

[FIG. 3]
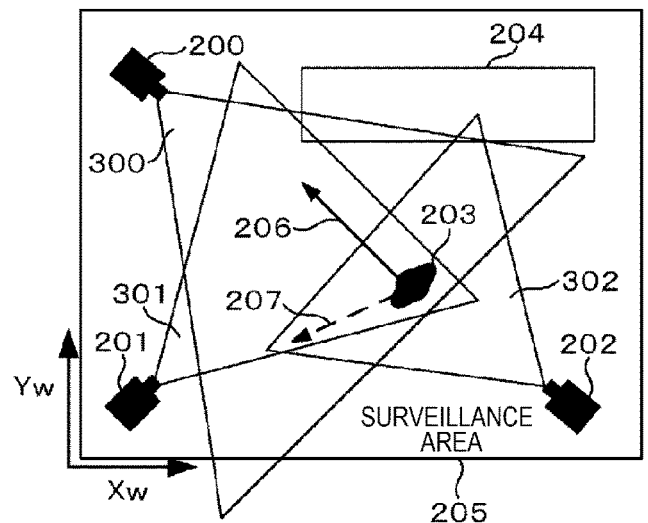
[FIG. 4]
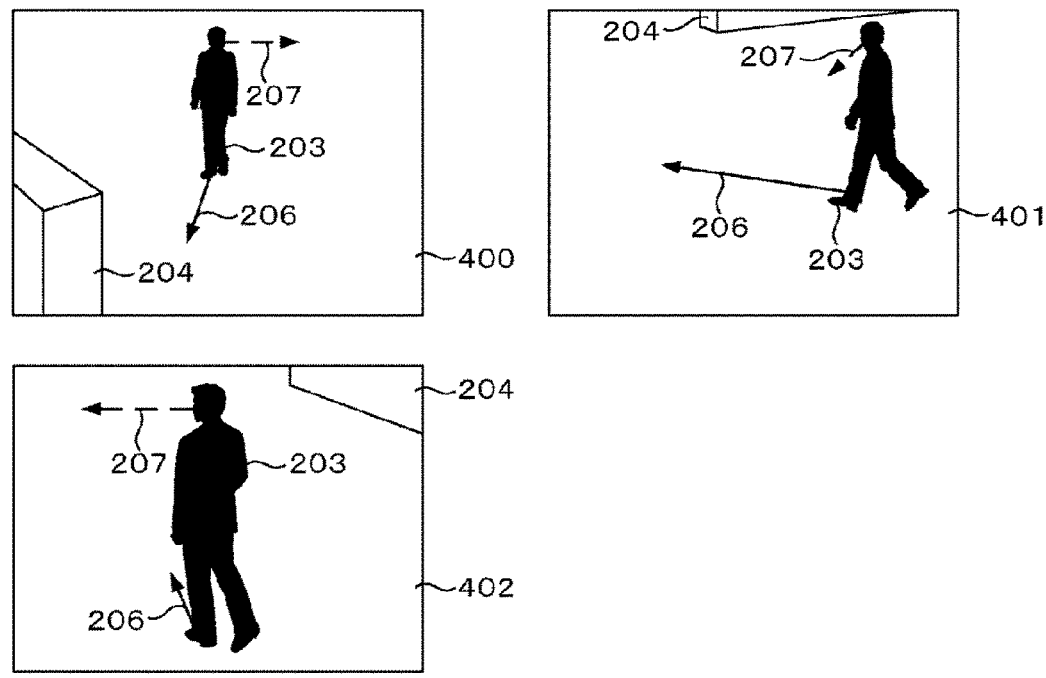

[FIG. 5]
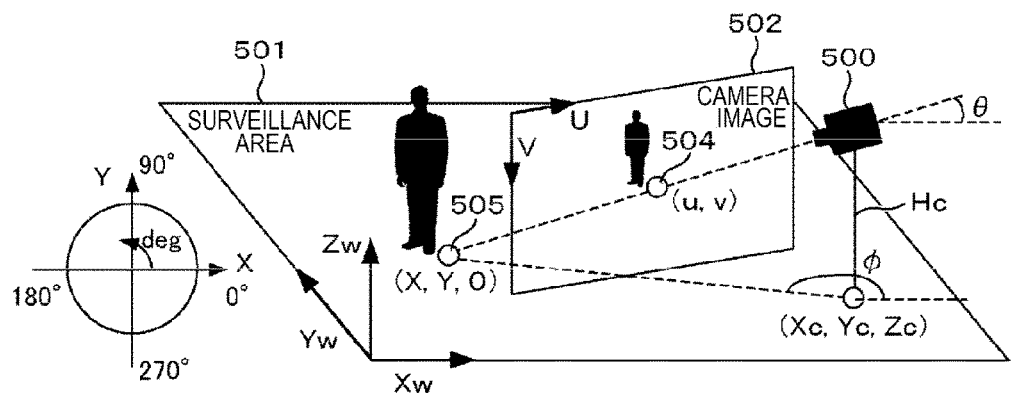
[FIG. 6]
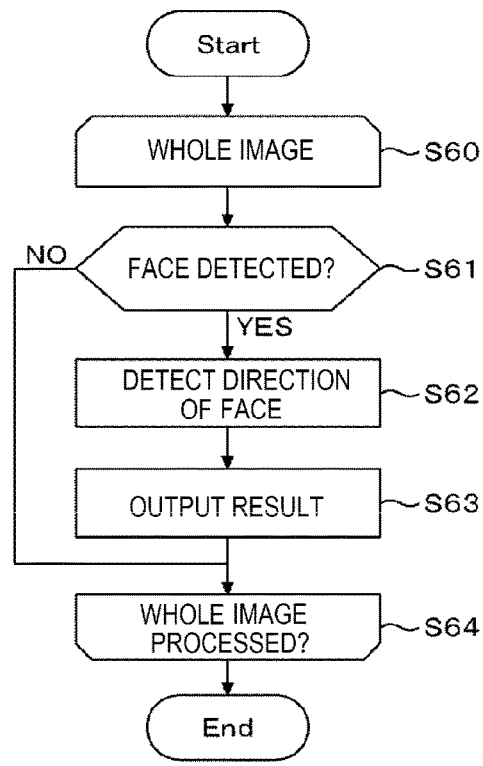

[FIG. 7]
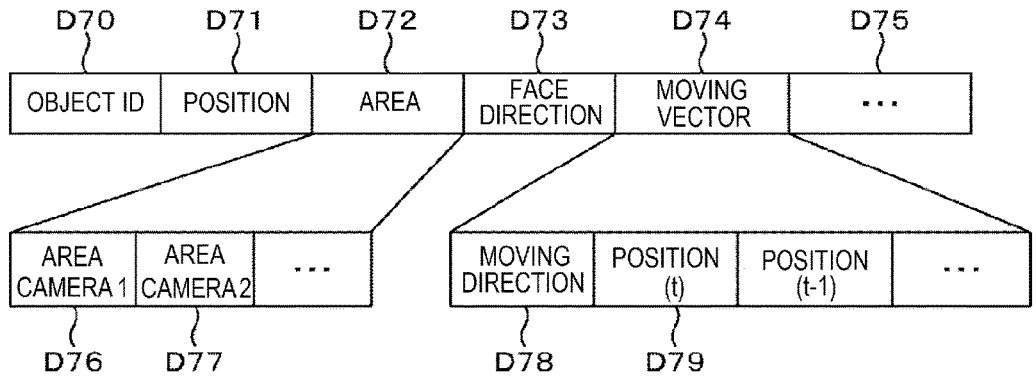
[FIG. 8]
| D80 | D81 | D82 | D83 | D84 |
|---|---|---|---|---|
| CAMERA ID | ANGLE OF DEPRESSION | HORIZONTAL FOV | ANGLE OF VIEW | INSTALLATION POSITION |
| 1 | 30deg | −45deg | 45deg | (30, 500, 500) |
| ... | ... | ... | ... | ... |
[FIG. 9]
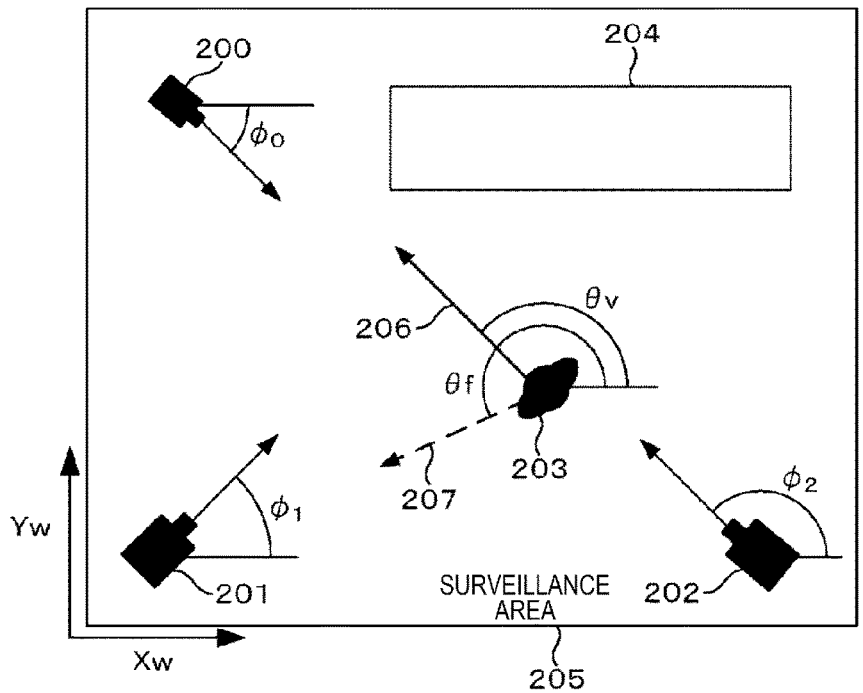

[FIG. 10]
| D1000 → CAMERA EVALUA-TION ITEM | CAMERA 200 | CAMERA 201 | CAMERA 202 | ... |
|---|---|---|---|---|
| D1002 → DISTANCE | 250cm | 200cm | 150cm | ... |
| D1003 → AREA | 7000px | 8000px | 20000px | ... |
| D1004 → FACE DIRECTION | −45deg | 170deg | 45deg | ... |
| D1005 → MOVING DIRECTION | 180deg | 45deg | 0deg | ... |
| ... | ... | ... | ... | ... |
(D1001 spans CAMERA 200, CAMERA 201, CAMERA 202)
[FIG. 11]
1100
SETTING OF PRIORITY DEGREE
DISTANCE  [0]
AREA      [1]
FACE DIRECTION [3]
MOVING DIRECTION [1]
[FIG. 12]
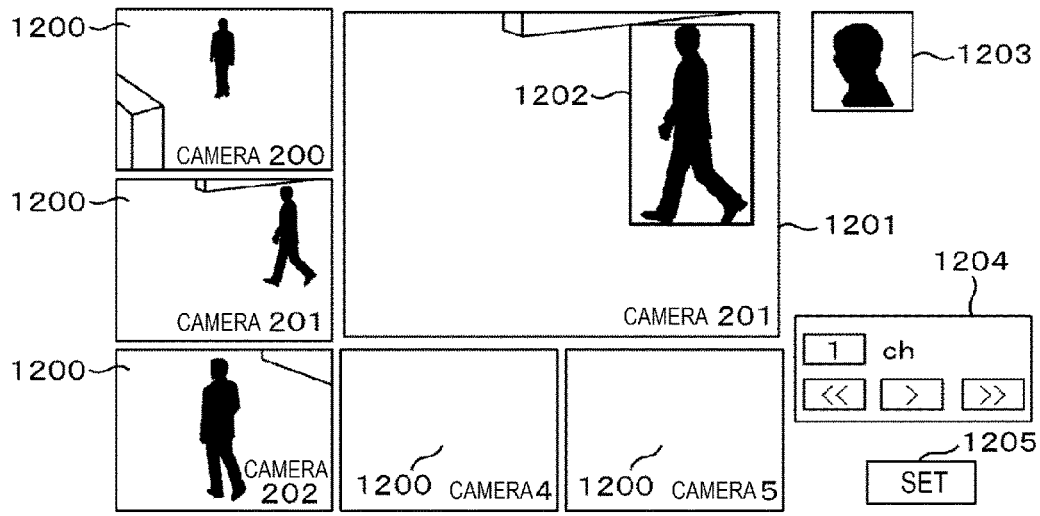

[FIG. 13]
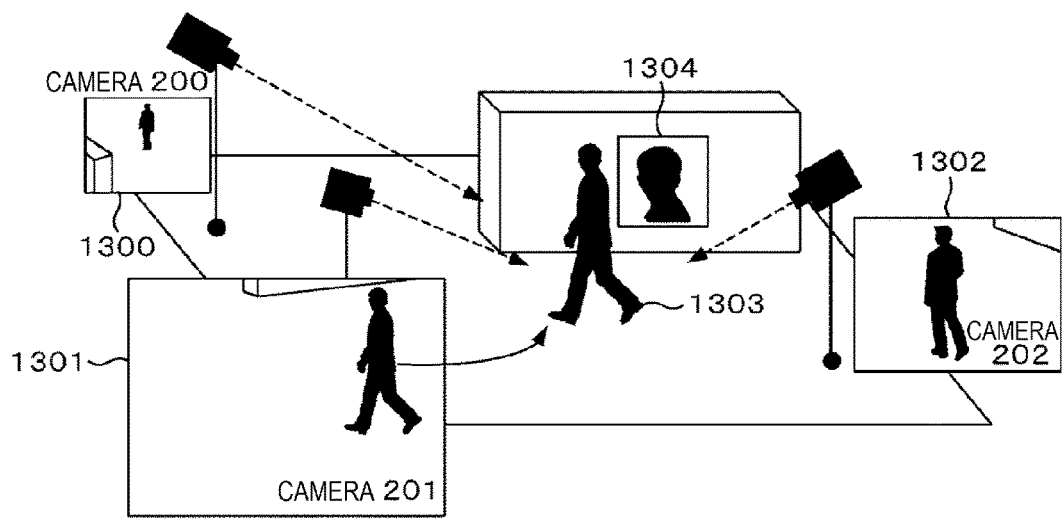

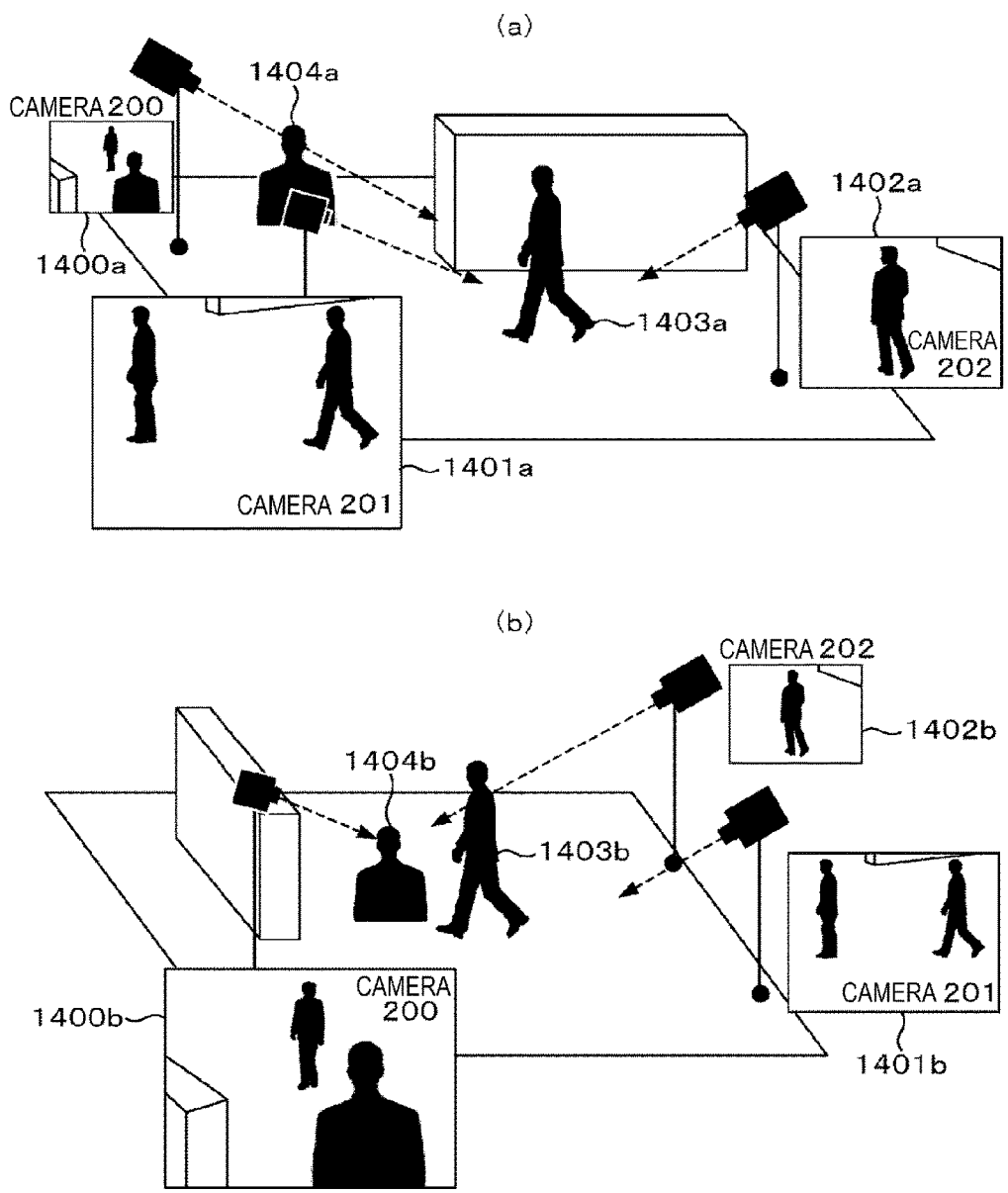
[FIG. 14]

[FIG. 15]
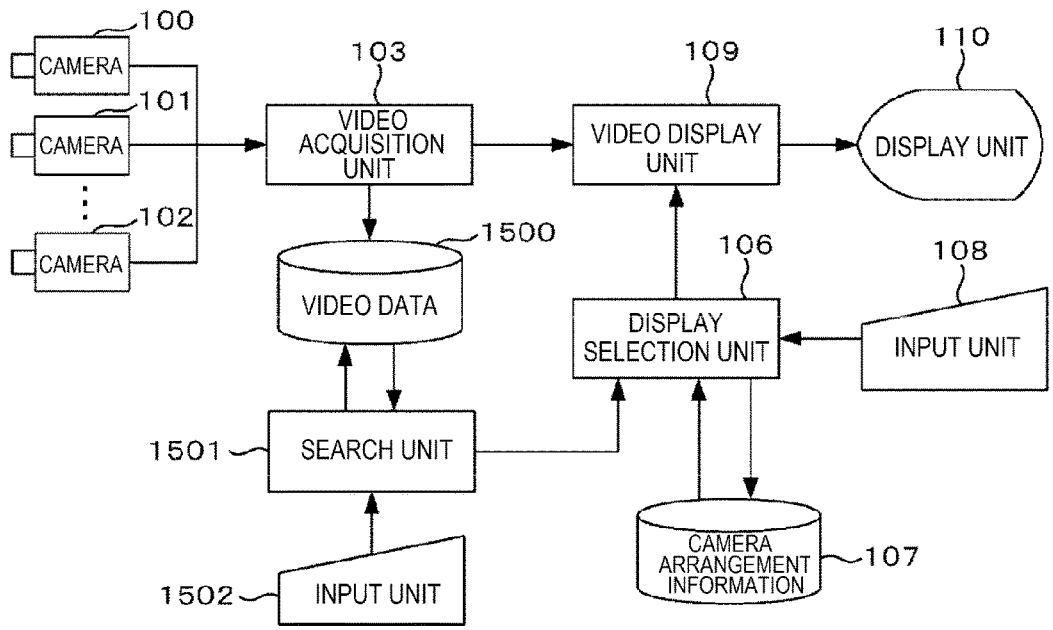
[FIG. 16]
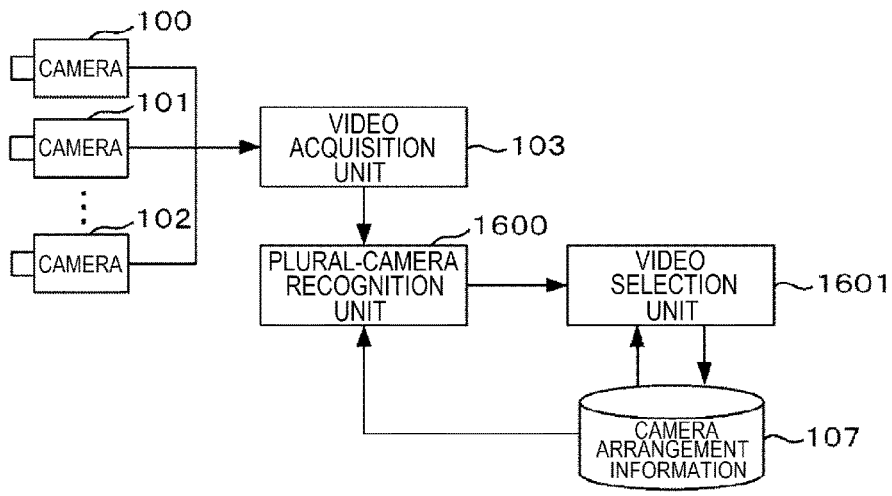

SURVEILLANCE CAMERA CONTROL DEVICE AND VIDEO SURVEILLANCE SYSTEM

TECHNICAL FIELD

The present invention relates to a video surveillance system which has a recognition device to detect a person or moving body from a video acquired from an image pickup device such as a camera, and which realizes functions such as intruder detection or approacher detection installed on a mobile robot, and particularly to a video surveillance system having a control function for video acquisition and video display in the video surveillance system.

BACKGROUND ART

A video surveillance system has a function of performing recognition processing on a video acquired form an image pickup device such as a camera and detecting a moving object such as a person or vehicle appearing in a surveillance area. This video surveillance system has a function of recording only a video in which a moving object appears, by utilizing the result of the detection, a function of presenting a warning icon to a display device, and a function of sounding a buzzer or the like to draw attention of surveillance officers, and the like. Therefore, the system serves for reduction in the burden of surveillance work in which constant confirmation work was required before. Also, with this video surveillance system, if a criminal act such as theft or a wrongdoing occurs, the recorded video can serve for the criminal investigation or the like after the incident.

Recently, due to the diversification of crimes, increase in the number of crimes committed and fall in arrest rate, awareness of crime prevention is raised at mass merchandisers, financial institutions, buildings and business offices, and the like, and introduction of video surveillance systems is in progress. As video recording devices have larger capacities and cameras are installed at various places due to widespread availability of network cameras and the like, the number of cameras is increased. As described above, sifting through recorded videos to spot a criminal act or the like by visual inspection work by surveillance officers is a very heavy burden. Therefore, assistance functions for surveillance work are increasingly demanded.

The problem here is that, with the increase in the number of cameras, the work of surveillance officers observing a desired video, for example, a specific person, becomes very complicated. Unless they are skilled officers with full knowledge of the surveillance area and the status of the surveillance cameras, it is difficult to observe videos efficiently without any oversight.

Conventionally, a surveillance system is known in which moving positions of a camera with a pan head control function are registered in advance, and in which a video of a surveillance area is acquired while the pan head of the camera is turned to a predetermined position, linked to the result of detection by a sensor (PTL 1). Also, a surveillance system is known in which the positional relation between a plurality of cameras is registered and in which a video displayed on a monitor is switched on the basis of a user's instruction or the moving direction of a moving object (PTL 2).

CITATION LIST

Patent Literature

PTL 1: JP-A-2001-275104
PTL 2: JP-A-2011-217320

SUMMARY OF INVENTION

Technical Problem

However, in the surveillance system described in PTL 1, as the number of cameras that operate in the system increases, the number of cameras that turn according to detection by the sensor increases. Therefore, advance setting and adjustment within the system need to be carried out in detail and the burden on surveillance officers tends to increase.

Also, a time lag or the like occurs when the system operates while a surveillance officer operates the pan head control function. Therefore, there is a high possibility of oversight in tracking an intruder or specific person.

Thus, conventionally, there is a system which has a recognition function and performs automatic tracking. For example, PTL 2 is known. As in the surveillance system of its invention, a plurality of cameras installed in a surveillance area are fixed cameras with their positional relation registered in advance, and the positional relation is utilized. Specifically, if a moving object comes off the angle of view on the screen of each camera, a camera installed in the moving direction thereof is presented to the surveillance officer. This can also be realized through designation of a direction by a manual input measure by the surveillance officer.

However, while it is possible to present the video of a camera that is subsequently picked up in view of the movement of the moving object on the basis of the positional relation of the cameras, there are cases where the video should be displayed as it is, depending on the status of installation of the cameras. This is because, since the moving object as a subject is tracked on the basis of the movement thereof or the like, if an image is picked up from a direction that is not suitable for obtaining information to specify the subject (for example, an area where an image of the face of a person or the license plate or the driver of a vehicle is not picked up), the image is picked up in a direction in which important information of the movable object cannot be obtained, and therefore there is a possibility that it is difficult to utilize the image for circumstantial evidence or the like.

Also, in the case where cameras overlap with each other, or where there is a degree of freedom in the moving area of the moving object such as an open surveillance area like an office or retail store, instead of a surveillance area where the moving area is limited such as a corridor, there is difficulty with simply registering the arrangement relation of the cameras in advance, as described in PTL 2. This does not result in a simple structure, for example, such that as the moving object moves to the right of the angle of view, the video of the camera installed on the right is presented. Therefore, conditions for selecting a camera to present a video are expected to be very complicated.

Thus, the invention provides a surveillance camera control device and a video surveillance system in which, if an identical object is detected duplicately by a plurality of surveillance cameras that pick up images of a plurality of areas, a proper video is selected from the videos of the respective cameras.

Solution to Problem

In order to solve the above object, for example, the configurations described in the claims are employed. To give an example thereof, a configuration includes a plurality of cameras which pick up images within a surveillance area, and a recognition unit which detects an object from videos acquired in the plurality of cameras. The configuration includes a display selection unit which, in the case where an object is detected in the surveillance area where images are picked up duplicately by the plurality of cameras, acquires a recognition result that is a feature quantity of the object for each camera by the recognition unit, and which, on the basis of the result of recognition and a degree of priority of the result of recognition, prioritizes the video of each camera according to the degree of priority.

Advantageous Effect of Invention

According to the invention, if an identical object is detected duplicately by a plurality of surveillance cameras which pick up images of a plurality of areas, information useful for identification of the object or the like can be presented on the basis of the video of each camera.

BRIEF DESCRIPTION OF DRAWINGS

FIG. 1 is a block diagram showing a video surveillance system according to an embodiment of the invention.

FIG. 2 is a view showing a surveillance area and the arrangement of cameras according to the invention.

FIG. 3 is a top view of the surveillance area and the arrangement of the cameras according to the invention.

FIG. 4 is an example of output of acquired videos according to the invention.

FIG. 5 is a view showing the correspondence between a camera image and a surveillance area according to the invention.

FIG. 6 is a view showing a processing flow in a recognition unit according to the invention.

FIG. 7 is a view showing the data structure of a result of recognition according to the invention.

FIG. 8 is a view showing the data structure of camera arrangement information according to the invention.

FIG. 9 is a top view showing information of cameras and a moving object in a surveillance area according to the invention.

FIG. 10 is a view showing an information table calculated from a result acquired by the recognition unit and camera arrangement information according to the invention.

FIG. 11 is a view showing a priority degree setting unit according to the invention.

FIG. 12 is a view showing a video display method according to the invention.

FIG. 13 is a view showing a video display method according to the invention.

FIG. 14 is a view showing a method for switching video displays according to the invention.

FIG. 15 is a block diagram showing an embodiment of the invention.

FIG. 16 is a block diagram showing an embodiment of the invention.

MODE FOR CARRYING OUT THE INVENTION

Hereinafter, an embodiment of the invention will be described in detail with reference to the accompanying drawings.

FIG. 1 is a block diagram showing a surveillance camera control device and a video surveillance system according to an embodiment of the invention. In this example, the surveillance camera control device and the video surveillance system may be described simply as a video surveillance system or a surveillance system.

This video surveillance system includes cameras 100 to 102, a video acquisition unit 103, a recognition unit 104, a recognition result 105, a display selection unit 106, camera arrangement information 107, an input unit 108, a video display unit 109, and a display unit 110.

This video surveillance system has a configuration in which an electronic computer system is applied. The hardware of this electronic computer system includes a CPU, memory, I/O and the like. As predetermined software is installed in an executable manner, each functional unit expressed as a block in each drawing is realized.

In order to express the embodiment simply, the cameras 100 to 102 are described as three cameras in this example. However, the embodiment does not depend on this configuration and assumes a configuration in which two or more cameras are installed. The cameras 100 to 102 are image pickup devices including a camera lens with a zoom function, and an image pickup element (none of them shown) such as CMOS (complementary metal oxide semiconductor) or CCD (charge coupled device). With the cameras 100 to 102, the video acquisition unit 103 acquires video signals and outputs the video signals to the recognition unit 104 and the video display unit 109, described below.

Also, the cameras 100 to 102 are pan-tilt-zoom cameras that are placed on a pan head and capable of depression/elevation and turning. Although not described in this example, it is obvious that the videos of the cameras 100 to 102 may be transferred to a recording device or display device and that the videos may be recorded or utilized for visual confirmation by a surveillance officer.

The display unit 110 is a display device such as a liquid crystal display device or CRT (cathode ray tube) display device. Instead of providing the display unit 110, an RGB (red-green-blue) monitor output, or a data output via a network and a terminal such as a mobile phone or tablet may be used.

Setting of various parameters is executed via a user interface. The user interface provided in the video acquisition unit 103, the recognition unit 104, the video display unit 109 or the like includes an input device (not shown) such as a mouse or keyboard, and accepts input of a parameter or the like from the user. In order to explain fundamental parts of the invention, only the input unit 108 is described as a unit for inputting a parameter or the like to the display selection unit 106.

Next, the relation between cameras and a moving object in the surveillance system of the invention will be described, using FIG. 2 and the like, prior to detailed explanation of the configuration block of the invention.

FIG. 2 shows the relation between a surveillance area 205, cameras installed there, and an object or the like according to this example. In the surveillance area 205, cameras 200 to 202 (similar to the cameras 100 to 102 in FIG. 1) are installed and an object 203 exists. Also, in many cases, architectural structures such as furnishings like shelves, or walls and corridors may exist in the surveillance area 205, and such a structure is illustrated as a structure 204. This example is a case where the object 203 is a person, and the person is moving in the direction of a moving direction 206 and facing a face direction 207.

Here, the object may include a movable object and a still object. A movable object refers to an object that can move or change. In this, example, a person is illustrated as an example of a movable object. This is because a person is an object that can move or change in the face, hands and feet, or as the person as a whole. Moreover, as a movable object, a vehicle, a bag held by a person, the screen of a personal computer, the door of a safe or the like can be employed. For example, the screen of a personal computer, or the door of a safe or the like is an object such that the direction of the screen and the display on the screen can be changed by a person, or such that the door of the safe can be opened. Also, a still object that does not move or change can be applied to the invention.

The surveillance area 205 is used synonymously with real space or the like, and a coordinate system thereof (Xw, Yw, Zw) is defined in advance.

Next, a top view in the case where the surveillance area 205 is observed from above is shown in FIG. 3.

Here, image pickup areas 300 to 302 (used synonymously with angles of view) corresponding to the respective cameras are shown additionally. Other parts are similar to FIG. 2. In the surveillance area 205, the object 203 exists, shown as moving in the moving direction 206 and facing the face direction 207.

FIG. 4 illustrates videos picked up by the respective cameras 200 to 202. Camera images 400 to 402 represent videos picked up by the cameras 200 to 202, respectively. These images are acquired via the video acquisition unit 103 of FIG. 1 and displayed on the display unit 110 via the video display unit 109. Depending on the statuses of installation and the image pickup areas 300 to 302 of the respective cameras, images including the object 203 and the structure 204 are picked up. The way the object 203 and the structure 204 look, the size of the object 203, and the way the moving direction 206 and the face direction 207 look, vary depending on the positional relation with the cameras 200 to 202.

In the illustrations showing the surveillance area 205 and the object 203 or the like shown in FIGS. 2 to 4, the object 203 is moving in the direction of the camera 200, and the face direction 207 faces the direction of the camera 201. Also, the object 203 is located at lower right from the center of the Xw-Yw space of the surveillance area 205, and the camera 202 is the nearest camera thereto.

Here, an example of calculating a correspondence between cameras and a surveillance area will be described.

To calculate a correspondence between cameras and a surveillance area, that is, camera parameters, which are not limited to this example, there are methods ranging from a simple method with approximation to a detailed method. This correspondence is used to acquire the camera arrangement information 107 shown in FIG. 1.

FIG. 5 is a view showing corresponding points on a surveillance area and a camera image acquired by a camera.

Specifically, a method for taking corresponding points on a surveillance area 501 (synonymous with the surveillance area 205 and real space) and a camera image 502 acquired by a camera 500 may be considered, as shown in FIG. 5. The camera 500 exists at a position (Xc, Yc, Zc) on the surveillance area 501.

The correspondence between an arbitrary camera image position 504 on the camera image 502 and a surveillance area position 505 on the surveillance area 501 can be found on the basis of the position on the image and an actually measured value in the real space. As a method for acquiring camera parameters after acquiring these corresponding points, an existing technique is known with respect to camera calibration technique, for example, R. Y. Tsai, "A versatile camera calibration technique for high-accuracy 3D machine vision metrology using off-the-shelf TV camera and lenses," IEEE Journal of Robotics and Automation, Vol. RA-3, No. 4, pp. 323-334, 1987. Here, detailed explanation thereof is omitted. With respect to the method in which camera parameters are found on the basis of the corresponding points, it is known that acquisition of four or more points enables acquisition of camera parameters.

By this procedure, an angel of depression $\theta$ of the camera 500, an angle of installation $\phi$ on the surveillance area 501, and a height Hc of the camera can be found, as shown in FIG. 5.

Next, the description is given in order from the recognition unit 104 shown in FIG. 1. The recognition unit 104 executes recognition processing on an arbitrary video, of the plurality of videos acquired by the video acquisition unit 103.

FIG. 6 is an example of a flowchart illustrating the processing by the recognition unit 104, and shows detection of the face and face direction of a person in this example.

A broad range of techniques for detecting the face of a person are proposed. For example, an existing technique is known such as the one described in Paul. Viola, M. Jones, "Robust Real-Time Face Detection," International Journal of Computer Vision (2004), Volume 57, Issue 2, Publisher: Springer, pages 137-154, and the like. In these techniques, image features of faces are acquired from learning samples, thus constructing an identifier. With this identifier, where a face exists on an image is determined. Also, by dividing the learning samples into various partial samples such as front and side samples and then constructing an identifier for each, it is possible to recognize face directions. The description is given below with reference to FIG. 6.

S60 is a procedure of operating an image as a whole in an arbitrary window (detection window). After that, whether a face is detected or not at an arbitrary position, using the above identifier, is outputted (S61). If a face is not detected, the window is shifted to the next position and similar processing is repeated. If a face is detected, the direction of the face is detected (S62). The result of this is outputted to a predetermined memory area (S63). As the above processing is repeated within the entire image, the position and face direction of a face can be detected. As the position of a face is detected, the position where a person exists can also be detected simultaneously. Finally, the processing on the image as a whole is confirmed (S64).

Here, details of the recognition unit 104 are described, using the detection of a face as an example. However, there are various other methods for acquiring information from an image. For example, if an identifier is formed to detect a person as a whole, instead of face detection, person detection can be realized and the direction of the body can be similarly found. Also, if the position of a person on an image is detected, the size thereof (area on the image) can be found naturally. Moreover, by finding positions shifting across a plurality of frames (images) taken continuously over time in the detected area, it is possible to execute tracking processing of a person.

Also, in the case of a vehicle, arbitrary information on an image can be acquired, such as the license plate or the driver's face.

Moreover, by taking the correspondence between the position detected in the above processing, and the surveillance area 501 and the camera image 502 described with reference to FIG. 5, it is possible to find the position on the surveillance area 501 (the same applies to the surveillance area 205 of FIGS. 2 to 4) and the movable direction (moving direction 206 of FIGS. 2 to 4), and the face direction (face direction 207 of FIGS. 2 to 4) or the like. With this configuration, which direction a person facing to the right in the camera image 502 faces in the surveillance area can be found on the basis of the correspondence between the surveillance area 501 and the camera image 502. That is, not only the position but also the direction can be acquired.

FIG. 7 is an example of the data structure in the case where the result found by the recognition unit 104 is stored in the recognition result 105. This data includes the object ID (D70), the position of the object in real space (D71), the area on the image (D72), the face direction (D73), the moving vector (D74), and other information (D75).

The area (D72) varies depending on each camera that picks up an image of an object, and therefore is stored for each camera by which an image of an object is picked up, for example, area-camera 1 (D76), area-camera 2 (D77), and so on.

Meanwhile, the moving vector 74 holds information dating back to the past over a predetermined period from the present time t and is stored as position (t) (D79) or the like. Based on those pieces of information, the moving direction (D78) is stored as well. The moving direction (D78) can be calculated by average value of information of position (t) (D79) or the like. With these pieces of information, the moving direction on the surveillance area with respect to the direction on the camera image can be found by finding the correspondence as in FIG. 5, similarly to the face direction.

The other information (D75) can also be included in the data if the information is processed by the recognition unit 104.

Next, the display selection unit 106 shown in FIG. 1 will be described. First, the camera arrangement information 107 used by the display selection unit 106 will be explained.

As the camera arrangement information 107, there are information indicating the positional relation of cameras, and information indicating the relation between a moving object and camera images. The former can be acquired by finding the above correspondence between the cameras and the surveillance area, and as a matter of course, can also be found by actual detailed measurement. The latter can be acquired by camera calibration.

FIG. 8 shows an example of the information of the positional relation of cameras in this example.

The positional relation of cameras includes (D80) that is an arbitrarily allocated camera ID, the angle of depression (D81) of the camera, the horizontal FoV (D82) of the camera, the angle of view (D83), and the installation position (D84). The angles and absolute position are stored, respectively. This enables prescription of the direction in which the camera faces and the video that is to be picked up, and also enables the positional relation with each camera to be grasped.

In the case where information is found by the camera calibration technique as described above, a perspective projection-based transformation matrix of the surveillance area 501 and the camera image 502 shown in FIG. 5 can be acquired. Depending on embodiments, this information may be stored in the camera arrangement information 107. Also, the focal length, the rotation of the optical axis direction, and the size of the image pickup element have relevance to the positional relation of cameras and therefore can be added as information.

FIG. 9 is a top view observing, from above, the surveillance area 205 in the example shown in FIGS. 2 to 4.

In FIG. 9, the cameras 200 to 202, the object 203, and the structure 204 are shown, as in FIGS. 2 to 4. Here, it is assumed that data including the moving direction 206 and the face direction 207 is acquired via the recognition unit 104. Also, the positional relation of each camera is similarly acquired from the camera arrangement information 107.

The cameras 200 to 202 are installed at angles $\phi_0$ to $\phi_2$ at the respective positions in the Xw-Yw space in the surveillance area 205. Also, the object 203 is moving in the direction of the moving direction 206 (angle $\theta v$) and the face direction 207 of the object 203 is defined by $\theta f$.

Using these pieces of information, processing to determine the video to be displayed is executed by the display selection unit 106.

FIG. 10 is an example of an information table found on the basis of the object 203 and the camera position and the like, of the camera arrangement information 107. Camera evaluation items (D1000) in the information table include the distance between the detected object and the camera (D1002), the area of the detected object, on the camera image (D1003) the face direction (D1004), and the moving direction (D1005). Evaluation values (D1001) are evaluation values for each camera. Specifically, the camera evaluation values (D1000) are calculated on the basis of the data of the object 203 and the camera position or the like found by the recognition unit 104, and this is calculated and acquired for each camera and shown as acquired values (D1001).

The distance (D1002) from the camera is found on the basis of the relation between the position on the image detected by face detection or person detection and the surveillance area 205. The area (D1003) is similarly found from the detected area. For the face direction (D1004), the face direction $\theta f$ on the surveillance area 205 can be found from the face direction on the camera image, and can be calculated on the basis of the difference in angle from the directions $\phi_0$ to $\phi_2$ of the cameras 200 to 202. For example, a calculation formula for the camera 201 (camera 2 in FIG. 10) is expressed by Math.1.

[Math.1]

$$\text{Camera 2 face direction} = (\phi_1 - \theta f) \quad (1)$$

Here, in the case of the face direction found by Math.1, as the angle becomes closer to 180 degrees, the image pickup direction of the camera and the face direction become more straight to each other, that is, the face direction faces the camera direction. Strictly, it is possible to find the angle in the vertical direction of the face with respect to the angle of depression of the camera. However, in this example, only the horizontal direction is employed for simplicity.

Also, the moving direction (D1005) can be found on the basis of a similar way of thinking and therefore description thereof is omitted here.

Moreover, in another embodiment, it is possible to define the direction with respect to a desired part, such as the direction in which a specific part of an object is detected, for example, the direction in which a piece of belongings such as a bag is held, or the direction in which an image of a part such as a hand is picked up. In the case where the object is a vehicle, an information table can be created on the basis of the license plate, the driver's face or the like. Also, the direction in which a specific act (event) can be observed may be employed. For example, the direction in which an image of a person doing an act of pressing a button can be picked up, or an act of picking up a product in hand, or the like may be employed.

This information table is stored in the camera arrangement information 107. As the camera arrangement information acquired in advance and the result of recognition are used together in this way, video selection can be decided in more detail. Also, by feeding the positional relation with cameras and the result of the recognition processing back to the recognition processing, a camera and a position on the video that are appropriate for the recognition processing can be selected. Therefore, it is possible to execute the recognition processing more accurately.

Next, with respect to the display selection unit 106, a method for switching video displays using the information table shown in FIG. 10 will be described.

FIG. 11 is an example of a priority degree setting screen 1100 for setting the degree of priority of a camera evaluation item that is to be acquired preferentially, of the above camera evaluation items, when using video information acquired from each camera in which an identical object is detected duplicately. The degree of priority is set, for example, via the input unit 108 of FIG. 1. On the screen, the degree of priority of each can be set. In this example, the degree of priority can be set from 0 to 5. In the case of 0, it means that the information is not to be used. In the case of 5, the information in question can be utilized with the highest priority. Here, the video to be outputted can be selected using only one piece of information. Also, several pieces of information can be integrated to find an evaluation value, thereby creating a reference for video selection. In the example shown in FIG. 11, the degrees of priority are set as: distance dp=0, area sp=1, face direction θfp=3, and moving direction θvp=1.

Here, the distance of each camera is defined as d, the area as s, the face direction as θf, and the moving direction as θv, and all the cameras are ranked with respect to each value on the basis of the camera arrangement information 107 shown in FIG. 1. To take the camera 1 as an example, the ranking of the camera 1 in relation to all the cameras is defined as: distance D1=3, area S1=1, face direction Θf1=1, and moving direction Θv1=3. Since these express the rankings among the cameras, the minimum value is 1 and the maximum value is equal to the number of the cameras.

A method for calculating an evaluation value of each camera for each arbitrary object on the basis of these rankings of each camera and the degrees of priority of camera evaluation items is expressed by Math.2. The calculation of the evaluation value is carried out by the display selection unit 106 shown in FIG. 1.

[Math.2]

$$\text{Evaluation value (camera 1)} = (D1 \times dp + S1 \times sp + \Theta f1 \times \theta fp + \Theta v1 \times \theta vp) \quad (2)$$

According to Math.2, the display selection unit 106 can decide that the camera having the lowest evaluation value is a suitable camera for observing the object 203.

For example, as a result of calculation using the information table of the camera evaluation items for each camera and the degree of priority of the camera evaluation items shown in FIGS. 10 and 11 with respect to the videos shown in FIG. 4, the video shown in the camera image 401 of FIG. 4 is found to be the most suitable video for observing the object 203.

Since the evaluation value for each camera is calculated for each object, the video of a camera that is suitable for each moving object is defined by the evaluation value. If there is a plurality of objects, there are coping methods such as performing control on a person that is picked up with the largest size in the image, or performing the processing of the invention only on a person selected via an input screen or the like.

Next, the video display unit 109 shown in FIG. 1 will be described, using FIG. 12. Here, it is assumed that, of the videos obtained from the video acquisition unit 103, a camera to display preferentially and the video acquired from the camera are calculated by the display selection unit 106. A part of the video example shown in FIG. 12 is similar to the example shown in FIG. 4, and this video can be easily observed because the face direction of the moving person picked up in the video from the camera 2 is in the camera direction.

FIG. 12 shows a part of the monitoring screens in the surveillance system. Here, videos from the respective cameras picking up images of the surveillance area are shown in small window areas 1200. Videos acquired through a video recording device or matrix switcher or the like are shown. Also, a video selected by the display selection unit 106 is shown in a large window area 1201. Although the setting or the like of these multiple screen outputs is not described in detail, the screen arrangement can be arbitrarily set according to the number of cameras used.

As a detection frame 1202 in which an object is detected is outputted, superimposed on the large window area 1201, it is possible to draw attention of surveillance officers. Also, it is possible to output additional information 1203 on the screen, using the result of face detection.

In the screen example shown in FIG. 12, a playback control unit 1204 for controlling recorded videos and the like is also provided and can be used for playback of the recorded videos. If the information table shown in FIG. 10 and the recognition result 105 are saved with the recorded videos, presentation of a video in which a person can be easily observed can be realized similarly with respect to the recorded videos. Also, the setting of the degree of priority can be set via a setting button 1205 or the like.

The screen example shown in FIG. 13 is a view showing an example in which the positional relation between the cameras and the moving object is shown in a visually intelligible manner, using the camera arrangement information 107. On a screen where data of the surveillance area and the positions of the cameras created by computer graphics are drawn, camera images 1300 to 1302 are shown closely to the camera positions. The respective camera images can also be displayed with the size thereof changed by a constant coefficient, according to the positions on the screen.

On the screen, an observed object 1303 is drawn on the basis of the position calculated by the recognition unit 104. As for this object 1303, by superimposing, on the screen, data created by extracting the moving person existing in the video from the camera calculated by the display selection unit 106 instead of a model of the person created by computer graphics, it is possible to observe the positional relation and the status of the object 1303 simultaneously. Also, by displaying additional information 1304 such as the face, it is possible to observe the object in more detail.

FIG. 14 is a view showing a case where a plurality of objects exists. In FIG. 14(*a*), camera images 1400*a* to 1402*a* are displayed similarly to FIG. 13. Also, an object 1403*a* and an object 1404*a* are drawn on the screen.

In the case where observation is to focus on, for example, the camera 2 image 1400*a* and the moving object 1404*a* in this video, the point of view can be transformed by an instruction from the user. As the user designates the position of the camera image or the moving object drawn on the screen which the user wants to observe, via an input device such as a mouse, the point of view is switched to focus on the camera 1 image 1400*b*, as shown in FIG. 14 (*b*). As the point of view is switched, the positions of the moving object 1403*b* and the moving object 1404*b* are changed, too. However, an image that is the easiest to observe is superimposed. Also, the image size or the like of the video from each camera can be changed according to the distance from the point of view.

In this way, by presenting a video with a display size or important information added thereto according to the degree of importance or the degree of notability of the video, or by a display method in which a video is presented in the form of being linked with the camera arrangement, it is possible to visually recognize the arrangement relation in the surveillance area. This enables the importance of the video and the correspondence in the surveillance area to be grasped simultaneously, thus leading to reduction in the burden on surveillance officers. Consequently, it is possible to provide a more robust surveillance system. Also, by prioritizing video displays on the basis of the degree of priority, it is possible to present and record a suitable video for observation of an object, and to play back a video to be observed, of recorded videos.

As a detection object to which the invention can be applied, a person may be employed as described above, and it is possible to execute face detection by recognition processing, and select and present, for example, a video in which an image of a face is picked up, from videos from a plurality of cameras. Other than a person, the invention can also be applied to a vehicle, a bag held by a person, the screen of a personal computer, the door of a safe or the like. The video of a camera that is suitable for monitoring a part to be observed can be decided, as in the case of a vehicle where the driver's face is monitored, or as in the case of a bag where the face of the person holding the bag or the bag itself is monitored. Moreover, a camera that is suitable for observing a part where a movement or change occurs can be selected, as in the case where the screen of a personal computer with a change in direction or screen display is monitored or as in the case where the door of a safe is opened. Thus, it is possible to monitor the personal computer screen constantly, or to monitor the door only when the door of the safe is opened. Also, the invention can be applied to a still object as well as a movable object. For example, in the case where a safe installed in a fixed manner is monitored and the surveillance area is to be switched from the door side to a lateral side, employing the configuration of the invention enables selection of a camera that is suitable for monitoring the lateral side so that the monitor screen can be switched.

FIG. 15 is an example of a configuration view in which the above example is used to search video data. Many of the respective functional blocks shown in FIG. 15 are similar to those shown in FIG. 1. Therefore, only sections relating to this example will be described.

A video acquired by the video acquisition unit 103 is stored in video data 1500. The search function in the surveillance system is one of measures to acquire data of this video data 1500. A search condition for a video to be acquired from the video data 1500 is inputted to a search unit 1501 via an input unit 1502. There are various search conditions, for example, a time bracket, a target camera, and a specific person or the like. However, the search unit 1501 here can have a recognition function similarly to the recognition unit 104 of FIG. 1. Also, information acquired by this recognition function can be acquired similarly to the recognition result shown in FIG. 7.

The recognition result acquired here is used by the display selection unit 106 to prioritize the video of each of the cameras, as in the above example. A video that can be easily observed can be selected and displayed on the display unit 110 via the video display unit 109.

A configuration in which the recognition result 105 is stored at the same time when video data is stored in the video data 1500 may be employed. In this case, since the search unit 1501 need not execute recognition processing, the search time can be reduced.

Moreover an example used to improve recognition performance on the basis of the above example will be described, using FIG. 16. Since some of the respective functional blocks are similar to those shown in FIG. 1, description thereof is omitted here. A video acquired by the video acquisition unit 103 is sent to plural-camera recognition unit 1600. In this example, since videos from a plurality of cameras are processed simultaneously in some cases, the recognition unit is distinguished from the recognition unit 104. The result of processing by the plural-camera recognition unit 1600 is sent to a video selection unit 1601. The video selection unit 1601 here has a similar configuration to the foregoing display selection unit 106. That is, after the recognition result is acquired, the result is utilized for selecting a suitable video for recognition processing.

As the recognition result processed by the plural-camera recognition unit 1600, there are a recognition result that can be expected to have high performance and a recognition result that cannot be expected to have high performance, depending on the installation state of the cameras 100 to 102. On the basis of the result outputted from the plural-camera recognition unit 1600, the video selection unit 1601 calculates an evaluation value similarly to the method expressed by Math.2 and outputs a suitable video for recognition processing, and feedback is made to the plural-camera recognition unit 1600. Thus, recognition performance can be improved.

For example, in the case of face detection as an example, which camera is the most suitable for face detection can be decided on the basis of the recognition result (recognition rate). Moreover, even on one camera image, an area where a good result of face recognition can be expected and an area where a good result cannot be expected can be calculated. Therefore, in this example, the plural-camera recognition unit 1600 can define a suitable camera for recognition and a suitable area for recognition in a camera image, and it can be expected that a surveillance system with higher detection accuracy is realized.

Also, in the case where accuracy with respect to the detected position of a person is considered, the camera image 400 of FIG. 4 has high position accuracy in the longitudinal direction and the camera image 401 has high position accuracy in the lateral direction. In the case of deciding the position, on the surveillance area, of a moving object observed across a plurality of cameras, the result to be outputted can be selected on the basis of information from these. Thus, highly accurate position detection can be carried out.

REFERENCE SIGNS LIST

100 to 102 camera
103 video acquisition unit 104 recognition unit
105 recognition result
106 display selection unit
107 camera arrangement information
108 input unit
109 video display unit
110 display unit
200 to 202, 500 camera
203, 1303, 1403, 1404 object
204 structure
205, 501 surveillance area
206 moving direction
207 face direction
300 to 302 image pickup area
400 to 402, 502, 1300 to 1302, 1400 to 1402 camera image
504 camera image position
505 surveillance area position
1100 priority degree setting screen
1200 small window area
1201 large window area
1202 detection frame
1203, 1304 additional information
1204 playback control unit
1205 setting button
1500 video data
1501 search unit
1502 input unit
1600 plural-camera recognition unit
1601 video selection unit

The invention claimed is:

1. A video surveillance system comprising:
a plurality of cameras which acquire videos in a surveillance area;
a recognition circuitry which detects an object from the videos acquired by the plurality of cameras and acquires a camera evaluation item that defines a relationship of the object relative to each camera;
a priority degree setting circuitry which decides a degree of priority of the camera evaluation item; and
video selection circuitry which:
calculates an evaluation value quantifying the relationship of the object relative to each camera,
prioritizes each video of the plurality of videos for display at a display according to the degree of priority of the camera evaluation item and the evaluation value, in the case where the object is detected in the surveillance area from videos acquired by two or more of the plurality of cameras,
selects a selected video suitable for recognition processing of the object based on the degree of priority of the camera evaluation item and the evaluation value,
superimposes a detection frame about the object on the selected video suitable for recognition processing of the object to be displayed on the display, and
outputs the selected video suitable for recognition processing of the object to the recognition circuitry;
wherein the recognition circuitry defines a suitable area for recognition of the object in the selected video.

2. The video surveillance system according to claim 1, wherein camera arrangement information relating to the object with respect to the plurality of cameras is acquired, using camera installation information of each of the plurality of cameras, and the evaluation value is calculated, using at least one of the camera arrangement information.

3. The video surveillance system according to claim 2, wherein the camera installation information includes information of camera position, angle of depression, horizontal FoV, angle of view, and rotation, and is calculated by acquiring a correspondence between the plurality of cameras and the surveillance area.

4. The video surveillance system according to claim 1, wherein the camera evaluation item comprises at least one of a moving direction, a size, and a predetermined area of the object.

5. The video surveillance system according to claim 1, wherein camera arrangement information including distances from the object to the plurality of cameras and a direction of the predetermined area and the moving direction of the object is acquired, using camera installation information of each of the plurality of cameras, and the camera evaluation item is calculated, using at least one or more of the camera arrangement information.

6. The video surveillance system according to claim 1, comprising the display which changes an output form of an output video from each of the cameras according to the prioritization.

7. The video surveillance system according to claim 6, wherein the output video outputted to the display shows the surveillance area and the positions of the plurality of cameras, and the video acquired by each of the plurality of cameras is combined with the output video and thus displayed.

8. The video surveillance system according to claim 6, wherein the output video outputted to the display is outputted, with the moving direction and the predetermined area acquired from the recognition result being combined with the output video as additional information.

9. The video surveillance system according to claim 6, wherein the selected video as a surveillance target is selected in the output video outputted to the display, thereby reconfiguring and outputting the output video in an arrangement that centers on the surveillance target.

10. The video surveillance system according to claim 1, wherein an output video of each of the cameras is recorded in a recording medium according to the prioritization.

11. The video surveillance system according to claim 1, wherein a surveillance area of the plurality of cameras or each of the cameras that is to be processed by the recognition circuitry is selected according to accuracy of the camera evaluation item.

12. A surveillance camera control device comprising:
a recognition circuitry which detects an object from videos obtained from a plurality of cameras which acquire the videos in a surveillance area, and acquires a camera evaluation item that is a feature quantity defines a relationship of the object relative to each camera; and
a video selection circuitry which:
prioritizes each video of the plurality of videos for display at a display according to a degree of priority of the camera evaluation item and the evaluation value, in the case where the object is detected in the surveillance area from videos acquired by two or more of the plurality of cameras,
selects a selected video suitable for recognition processing of the object based on the degree of priority of the camera evaluation item and the evaluation value,
superimposes a detection frame about the object on the selected video suitable for recognition processing of the object to be displayed on the display, and
outputs the selected video suitable for recognition processing of the object to the recognition circuitry;

wherein the recognition circuitry defines a suitable area for recognition of the object in the selected video.

13. The surveillance camera control device according to claim 12, wherein the camera evaluation item comprises at least one of a moving direction, a size, and a predetermined area of the object.

14. The video surveillance system according to claim 2, wherein the camera evaluation item comprises at least one of a moving direction, a size, and a predetermined area of the object.

15. The video surveillance system according to claim 3, wherein the camera evaluation item comprises at least one of a moving direction, a size, and a predetermined area of the object.

16. The video surveillance system according to claim 7, wherein the output video outputted to the display is outputted, with the moving direction and the suitable area for recognition of the object in the selected video acquired from the recognition result being combined with the output video as additional information.

17. The video surveillance system according to claim 7, wherein the selected video as a surveillance target is selected in the output video outputted to the display, thereby reconfiguring and outputting the output video in an arrangement that centers on the surveillance target.

* * * * *